(No Model.) 2 Sheets—Sheet 1.
C. CARR.
MACHINE FOR MOLDING MULTITUBULAR PIPES.
No. 395,740. Patented Jan. 8, 1889.
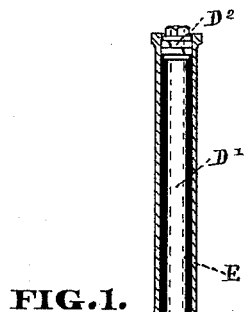
FIG. 1.
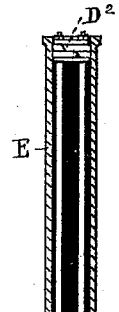
FIG. 2.
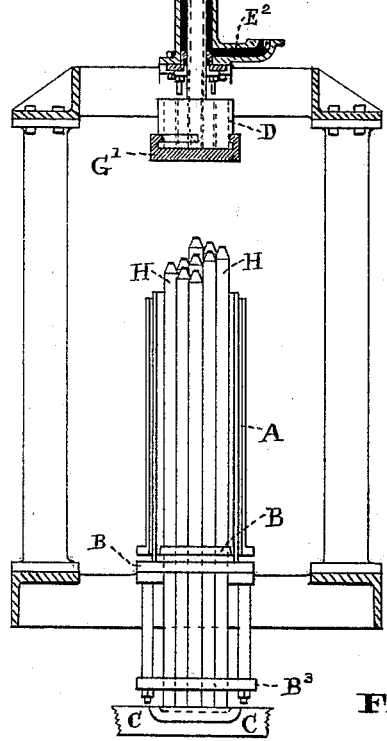
FIG. 7.
FIG. 6.
FIG. 8.
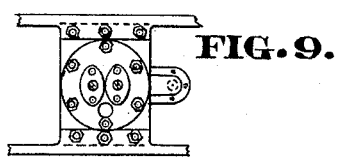
FIG. 9.
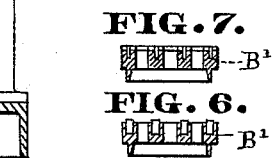
FIG. 5.
FIG. 10.
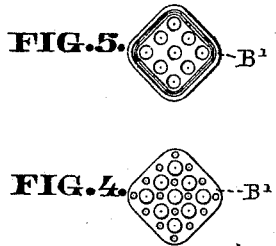
FIG. 4.
WITNESSES. INVENTOR.

(No Model.) 2 Sheets—Sheet 2.
C. CARR.
MACHINE FOR MOLDING MULTITUBULAR PIPES.
No. 395,740. Patented Jan. 8, 1889.
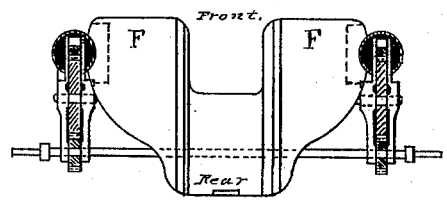
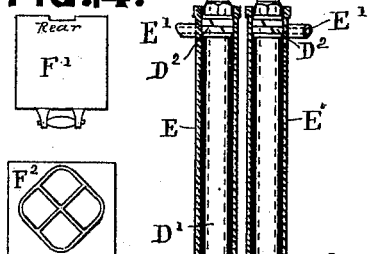
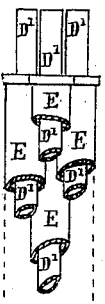
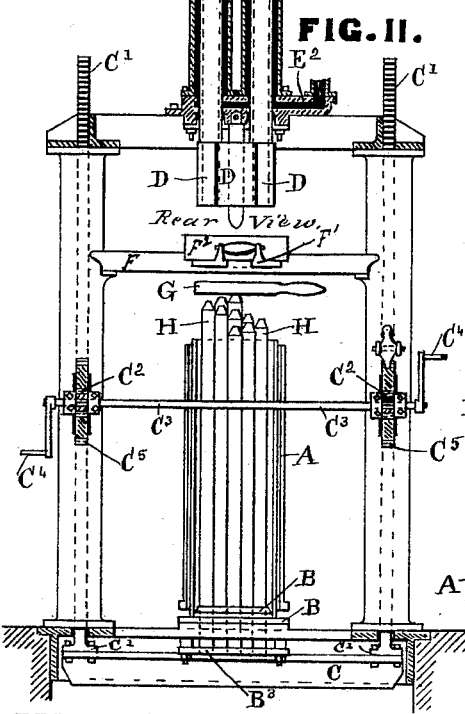
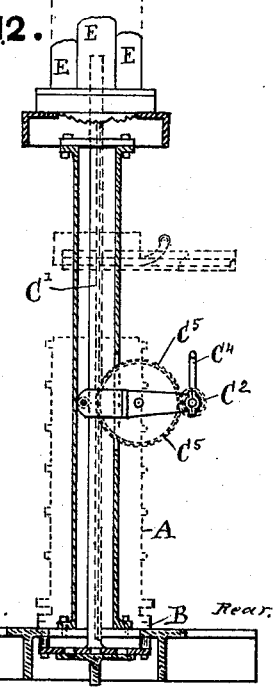
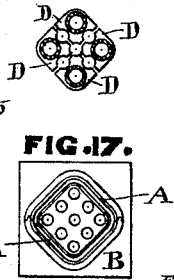
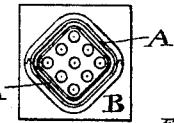
WITNESSES. INVENTOR.

UNITED STATES PATENT OFFICE.

CHARLES CARR, OF BOSTON, MASSACHUSETTS.

MACHINE FOR MOLDING MULTITUBULAR PIPE.

SPECIFICATION forming part of Letters Patent No. 395,740, dated January 8, 1889.

Application filed July 14, 1887. Serial No. 244,353. (No model.)

*To all whom it may concern:*

Be it known that I, CHARLES CARR, of Boston, county of Suffolk, and State of Massachusetts, have invented certain new and useful Improvements in Machines for Molding Multitubular Pipe; and I do hereby declare that the following is a full and exact description thereof, reference being had to the accompanying drawings, and to the letters of reference marked thereon.

With reference to the drawings, Figure 1 is a sectional elevation in which some features of my improvements are illustrated. Fig. 2 is a similar sectional elevation. Two solid or smaller hammer-rods are here shown. Fig. 3 is a sectional elevation of the top head of the mold. Fig. 4 is a plan of the top head of the mold. Fig. 5 is a plan of the same inverted. Fig. 6 is a vertical section through the upper head of the mold, illustrating the insertion of the blocks or dowels hereinafter referred to. Fig. 7 is a similar sectional elevation showing a layer of leather or other yielding material held on by the blocks or dowels. Fig. 8 is a sectional plan of the tamping-hammer. Fig. 9 is an under view of the cylinder with parts of the frame on which it rests. Fig. 10 is a horizontal section of cylinder and twin piston-rods. Fig. 11 is a sectional elevation of a machine in which my improvements are applied. Fig. 12 is a similar elevation taken at right angles and partly in dotted outline. Fig. 13 is a sectional plan showing parts of the machine. Fig. 14 is a plan of the feed-slide. Fig. 15 is a plan of the feed-hopper, which also slides. Fig. 16 is a sectional plan of the tamping-hammers. Fig. 17 is a plan of the two half-cases, the cores, and bottom heads pertaining to the mold.

Like letters refer to the same or corresponding parts in all the figures.

It has heretofore been necessary in machines of this class to make an elongated hammer with space between the hammer-head and the part attached to the piston-rod sufficient to reach down the length of the cores. This makes the machine inconveniently high.

One object of my present invention is to obviate this difficulty. In doing this I have also secured a better guiding of the hammers—*i. e.*, the hammer-head does not stand or operate so far away from the parts which guide it.

Referring to Fig. 1, notice that the tamping-hammer rod or shank is also the piston-rod, and works within the steam-cylinder nearly its whole length.

E is the cylinder, $D^2$ is the piston, and $D'$ is the piston-rod and at the same time the hammer-shank. The hammer-head D is connected directly to the piston-rod, is of comparatively short vertical length, and is perforated or made with through open spaces vertically to admit the free passage of the cores as the hammer-head passes up and down. By this means the hammer-head may rise almost to the cylinder, leaving only room for the stuffing-box-gland bolts. Thus the steam-cylinder is brought down near the mold, leaving only just sufficient room to strike the needed blow. The piston may be single if one of the cores or spaces between cores is central in the pipe-mold. When a core occupies the center, I make the piston-rod and hammer-shank hollow to pass down inclosing it. If a space occupies the center, this will admit a single solid rod. If preferred, when a core occupies the center, two piston-rods (twin rods) may occupy adjacent spaces, as illustrated in Figs. 2, 8, 9, and 10. In either case I have a directly-connected piston and hammer-head, the rod connecting the piston and hammer-head and performing the double function of piston-rod and hammer-shank. This arrangement secures great compactness, as the rods pass almost wholly into the cylinder, so that but little vertical space is required between the steam-cylinder and the mold.

The pipe-mold is made up of the two half-cases A A, the series of cores H H, and the top and bottom heads, $B'$ and B. The cores have their guides in the bottom head, B, and the part $B^3$. These bearings may be in the same casting or in separate ones, but must be sufficiently far from each other vertically to insure a stable support laterally to the cores. The cores rest upon the core bearer or rest C, which may be provided with racks $C'$ and pinions $C^2$, shafts $C^3$, and cranks $C^4$, for raising and lowering by hand or other power. The cores are made of unequal graduated lengths. They are lifted by the means above named, or any other preferred lifting device, to the position shown, where they stand during the filling of the pipe-mold with pipe material and the tamping of it, as hereinafter referred to. After the mold is filled, tamping completed, and top head, B', is put on, a blow or two from the hammer on the top head finishes the molding of the pipe or pipe-section.

The next operation is to loosen and draw down and out of the pipe-section the cores. This is done by first lowering the core bearer or rest a little, when a few light taps from the tamping-hammer with its removable face G' or upon a block or plank, G, placed upon the top of the cores, will start the cores one after the other in graduated succession, according to their graduated lengths. Then when the core-bearer is lowered the cores will descend out of the pipe-section. If adhesive material is used which prevents the cores following the core-bearer down, they may be each connected to the bearer by means of a retracting-rod having a play in the bearer sufficient for the first starting, just described.

The rack-and-pinion device for lifting the cores is shown in Figs. 11 and 12, and an intermediate wheel, $C^5$, is shown to carry the shaft $C^3$ farther from the center of the machine. This intermediate wheel is not indispensable, as the rack may be located outside of the posts, if preferred. A pawl is shown in Fig. 11 to hold the gear, and so hold the cores at any height desired. This is thrown out when it is desired to lower the cores.

A feeding-table is illustrated in Figs. 11, 12, 13, and 14. F is the table, and has fitted to it first the slide F'—over this the sliding hopper $F^2$. In supplying material to the mold during the tamping process, or rather in the intervals of the tamping process, the two slides are drawn to the rear to a stop, F', forming the bottom to $F^2$. In this position a feed of pipe material is put into the hopper $F^2$. It, with F', its bottom, is then moved to a stop—i. e., directly over the pipe-mold. Then the slide F' is withdrawn and the material falls into the mold. The hopper $F^2$ is then withdrawn and the hammers are let fall upon it one or more times, as required, and the process is repeated till the pipe is complete, as before described.

For operating the hammer or hammers one or more cylinders may be used. The one cylinder is illustrated in Fig. 1; two or more in Fig. 11, and four steam-cylinders in Fig. 12. In Fig. 11 the hammer is divided as for four cylinders, as in Fig. 16, and if four were used the other two would be one in front and one at the rear in the middle, as will be understood by Figs. 12 and 16.

$E^2$ shows the inlet and outlet passage for the steam, to which I apply any of the various kinds of approved steam and exhaust valves.

In the operation of the tamping-hammers steam is let in by the steam-valve under the piston, which lifts it to the desired height. Latches or catch-bolts may be used, if desired, to hold up the tampers, and by which they may be let fall; or they may be held up by the steam and let fall by opening the exhaust-valve.

When the pipe material is of such a nature that it is desirable to use several separate independent hammers, as in Fig. 16, the several-cylinder plan is best, and allows each hammer to act independently, so that each horizontal section of the pipe area is tamped no harder nor less hard than is due to the weight of that section of the hammer or hammers. In other cases I use the one cylinder as being the simpler.

When a very heavy hammer is required, the two-piston-rod plan of Fig. 2 may be used, as a larger area of piston for lifting it is secured with a like diameter of steam-cylinder. When a light hammer, the single hollow piston-rod will have sufficient lifting area of piston.

The hammer-facing G' (illustrated in Figs. 1 and 2) is applied with tongues and grooves. In Fig. 11 a detached one, G, is shown.

In Figs. 4 and 6 is illustrated a top head for the mold, provided with wood pins or blocks for the hammer to strike on. The grain of the wood should run vertically.

In Figs. 4 and 7 is illustrated a hard-leather facing, for the same purpose, pinned on.

I do not claim a series of retracting-rods of graduated lengths, as such are claimed in my application, Serial No. 244,352, now pending in the Patent Office.

I do not claim the series of freely and vertically sliding cores seated upon a vertically-sliding core rest or table, as this feature is claimed in my other application, Serial No. 244,352, filed July 14, 1887. Neither do I claim general lifting mechanism in combination with said cores and table; nor a set of separately free vertically-sliding cores and upper and lower guide-sockets in combination with a vertically-movable core-rest; nor upper and lower guides in combination with separately-movable vertically-sliding cores.

I claim—

1. In a machine for molding multitubular pipe, the combination of a series of separate steam-cylinders, pistons, piston-rod hammers, and a pipe-mold, substantially as described.

2. The combination of the follower and a series of dowel pins or blocks let into its upper face, substantially as described.

3. The combination of a perforated leather face with the dowel pins or blocks and the follower having a series of sockets in its upper face, substantially as described.

4. In a machine for molding multitubular pipe, a series of cores of gradually-varying length, in combination with the even or level-faced hammer or hammers and the pipe-mold, substantially as described.

CHARLES CARR.

Witnesses:
ALEX. BEAL,
D. N. B. COFFIN.